US010900264B2

(12) United States Patent
Chang et al.

(10) Patent No.: US 10,900,264 B2
(45) Date of Patent: Jan. 26, 2021

(54) HINGE STRUCTURE AND CASING USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ching-Chih Chang, Taipei (TW); Chin-Yueh Liu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 224 days.

(21) Appl. No.: 16/172,185

(22) Filed: Oct. 26, 2018

(65) Prior Publication Data

US 2020/0002985 A1 Jan. 2, 2020

(30) Foreign Application Priority Data

Jul. 2, 2018 (CN) .......................... 2018 1 0709241

(51) Int. Cl.
*E05D 1/06* (2006.01)
*E05D 11/06* (2006.01)
*G06F 1/16* (2006.01)

(52) U.S. Cl.
CPC ................ *E05D 1/06* (2013.01); *E05D 11/06* (2013.01); *E05Y 2900/606* (2013.01); *G06F 1/1681* (2013.01); *Y10T 16/53615* (2015.01)

(58) Field of Classification Search
CPC .. E05D 1/06; E05D 11/06; E05D 5/10; E05D 5/12; E05D 5/14; E05D 7/10; E05D 7/12; E05Y 2900/606; G06F 1/1681; G06F 1/181; H04M 1/0216; H04M 1/0214; H05K 5/0226; Y10T 16/53615; Y10T 16/5362; Y10T 16/535; Y10T 16/536; Y10T 16/54038; Y10T 16/542; F16C 11/04
USPC ................. 16/267, 268, 254, 260, 342, 355; 361/679.27; 455/575.3; 379/433.13
See application file for complete search history.

(56) References Cited

U.S. PATENT DOCUMENTS 8,474,099 B2 * 7/2013 Hung .................... E05D 11/105 16/267
2004/0000030 A1 * 1/2004 Pleiman ................ E05D 7/1077 16/267
2004/0049885 A1 * 3/2004 Lu ......................... G06F 1/1616 16/342
2005/0034273 A1 * 2/2005 Roy .......................... E05D 1/04 16/254
2012/0216371 A1 * 8/2012 Schneider ............... E05D 11/06 16/268
2018/0216380 A1 * 8/2018 Butler ....................... E05D 3/06

* cited by examiner

*Primary Examiner* — William L Miller
(74) *Attorney, Agent, or Firm* — Innovation Counsel LLP

(57) ABSTRACT

A hinge structure and a casing using the same are provided. The hinge structure includes a first component and a second component. The first component includes a shaft and a connection member, wherein the shaft is fixed on the connection member. The second component includes a bushing and a limiting member, wherein the shaft is received in the bushing, the limiting member is disposed on the bushing, and the first component is detachably installed on the second component through the limiting member.

8 Claims, 5 Drawing Sheets

HINGE STRUCTURE AND CASING USING THE SAME

This application claims the benefit of People's Republic of China application Serial No. 201810709241.1, filed Jul. 2, 2018, the subject matter of which is incorporated herein by reference.

BACKGROUND OF THE INVENTION

Field of the Invention

The invention relates in general to a hinge structure, and more particularly to a hinge structure whose one component rotates with respect to the other component and a casing using the same.

Description of the Related Art

Generally speaking, the hinge is commonly used for allowing one object to rotate with respect to the other object. For example, the hinge is used in the casing of a portable computer, the casing of a computer host or the door panel for providing an open/shut function to a display panel or a door panel. The current hinge structure is mainly formed of a shaft and two metal plates each having a bushing. The shaft and the two metal plates must be manufactured independently, not only incurring high manufacturing cost, but also requiring more assembly and disassembly time due to the shaft being mounted between the two bushings. Therefore, how to simplify the elements of the hinge structure and lower the manufacturing cost has become a prominent task for the industries.

SUMMARY OF THE INVENTION

The invention relates to a hinge structure formed of two components in which one component can rotate with respect to the other component. Since the shaft and one of the two components can be integrally formed in one piece, the element quantity of the hinge structure can be reduced and the manufacturing cost can be lowered.

According to one aspect of the invention, a hinge structure including a first component and a second component is provided. The first component includes a shaft and a connection member, wherein the shaft is fixed on the connection member. The second component includes a bushing and a limiting member, wherein the shaft is received in the bushing, the limiting member is disposed on the bushing, and the first component is detachably installed on the second component through the limiting member.

According to one embodiment of the invention, the shaft can be a hollowed body.

According to one embodiment of the invention, the shaft can be winded up together with the connection member.

According to one embodiment of the invention, the bushing has a close end and an open end opposite to the closed end.

According to one embodiment of the invention, the bushing has two opposite close ends and a radial opening disposed therebetween, and the shaft is received in the bushing via the radial opening.

According to one embodiment of the invention, the limiting member and the bushing are integrally formed in one piece, or the limiting member is a movable tongue disposed on the bushing.

According to one embodiment of the invention, the connection member includes a slot opposite to the limiting member, wherein the limiting member and the slot are separated from each other when the first component is at a first position, such that the first component and the second component are at a detachable state; the limiting member and the slot are coupled to each other when the first component moves to a second position from the first position, such that the first component and the second component are in a non-detachable state.

According to one embodiment of the invention, the connection member includes a slot opposite to the movable tongue, wherein the movable tongue and the slot are separated from each other when the movable tongue is at a first position, such that the first component and the second component are at a detachable state; the movable tongue and the slot are coupled to each other when the movable tongue moves to a second position from the first position, such that the first component and the second component are in a non-detachable state.

According to one embodiment of the invention, the hinge structure further includes at least one stopping member, wherein the stopping member and the first component interfere with each other when the shaft rotates to a predetermined angle.

According to one aspect of the invention, a casing including a door panel and the hinge structure disposed on the door panel is provided.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1:
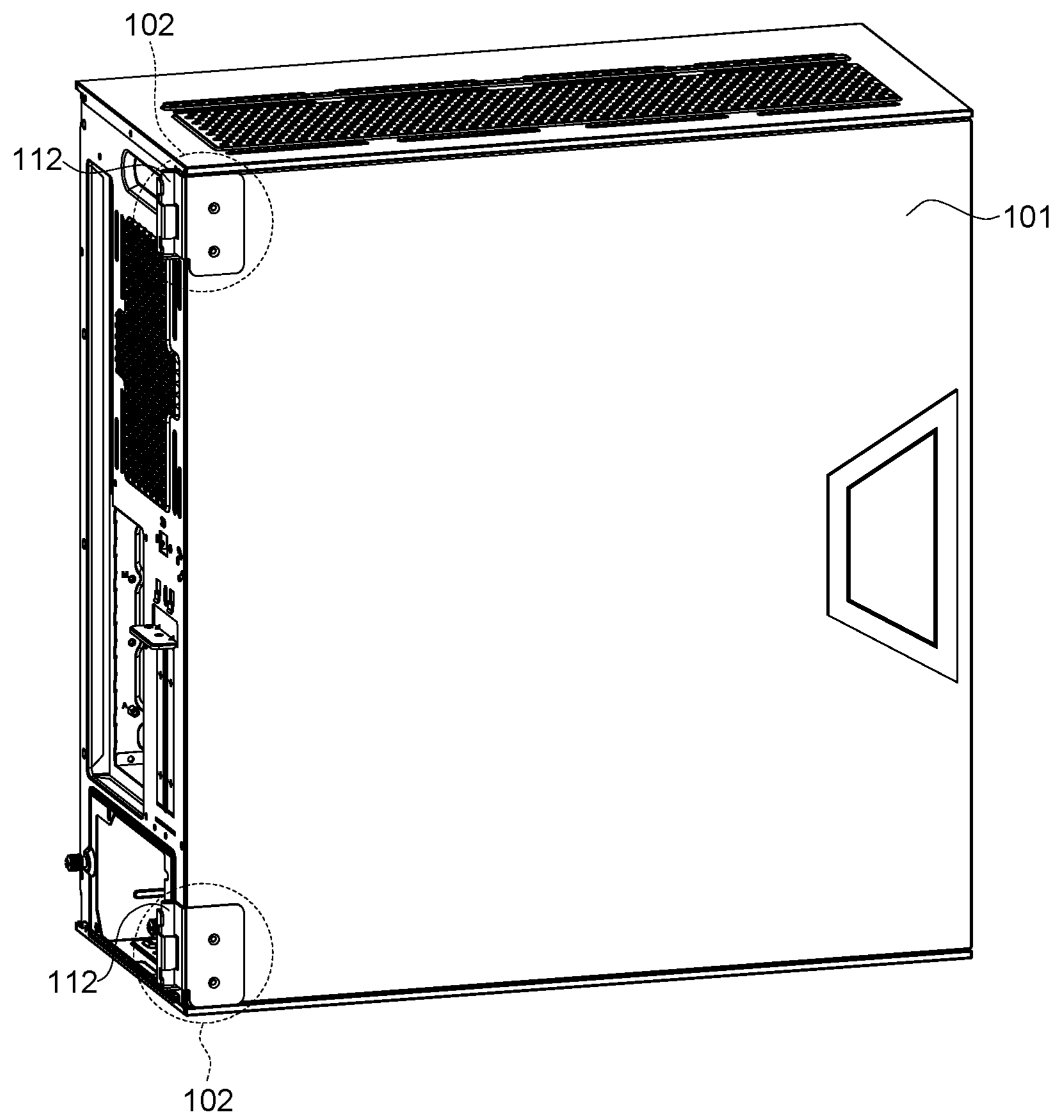
FIG. 1 is an appearance diagram of a casing according to an embodiment of the invention.

Refer to FIG. 1. The hinge structure 102 according to an embodiment of the invention can be used in a casing 100, such as the casing of a computer host, a server host or other products. The hinge structure 102 can be installed on the door panel 101 to provide an open/shut function to the door panel 101.

The quantity of the hinge structure 102 can be two. The two hinge structures 102 are respectively disposed at the top left corner and the bottom left corner of the door panel 101 for enabling the door panel 101 to rotate around the shaft 112 of respective hinge structure 102, but the invention is not limited thereto. The quantity of the hinge structure 102 can be one or more than one. In the following diagrams, the hinge structure 102 is disposed at the top left corner for an exemplary purpose. Similar arrangements are applicable to the hinge structure 102 at the bottom left corner, and the similarities are not repeated here.

Figure 2A:
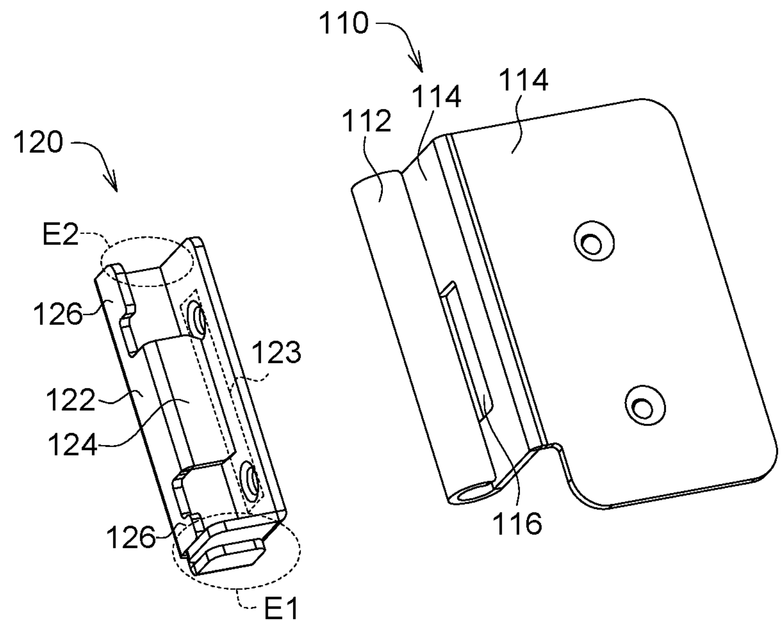
FIG. 2A is an explosion diagram of a hinge structure according to an embodiment of the invention.
Figure 2B:
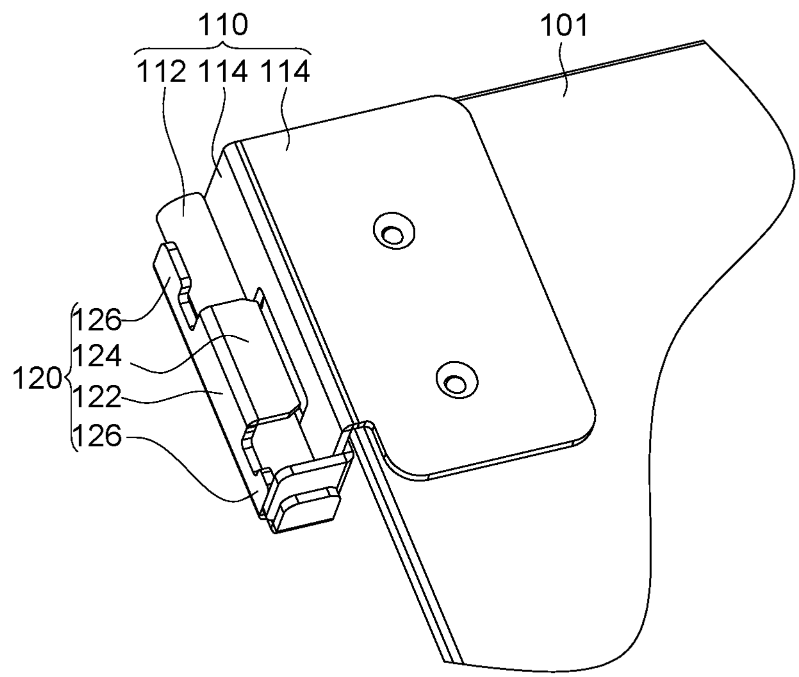
FIG. 2B is a combined diagram of a hinge structure and a door panel according to an embodiment of the invention.

Refer to FIGS. 2A and 2B. The hinge structure 102 includes a first component 110 and a second component 120. The first component 110 is installed at the top left corner of the door panel 101, and the second component 120 is installed at a fixing region (for example, the outer surface of the casing 100) corresponding to the top left corner of the door panel 101. The first component 110 includes a shaft 112 and a connection member 114, and the shaft 112 is fixed on the connection member 114. Besides, the second component 120 includes a bushing 122 and a limiting member 124, wherein the shaft 112 is received in the bushing 122, the limiting member 124 is disposed on the bushing 122, the shaft 112 has a rotational freedom, and the first component 110 can be detachably installed on the second component 120 through the limiting member 124.

Refer to FIGS. 2A and 2B. The first component 110 can be a metal plate formed by a metal stamping step, a winding step, a cutting step and a forming step. The shaft 112 can be realized by a hollowed body to reduce the weight. In an embodiment, the shaft 112 can be a crimping piece, which crimps together with the connection member 114, to reduce the manufacturing cost. Meanwhile, the shaft 112 and the connection member 114 are integrally formed in one piece to reduce the element quantity of the hinge structure 102. In an embodiment, the connection member 114 can be fixed on the door panel 101 using multiple locking pieces. Thus, the connection member 114 can be used as a fixing piece of the door panel 101.

Figure 2C:
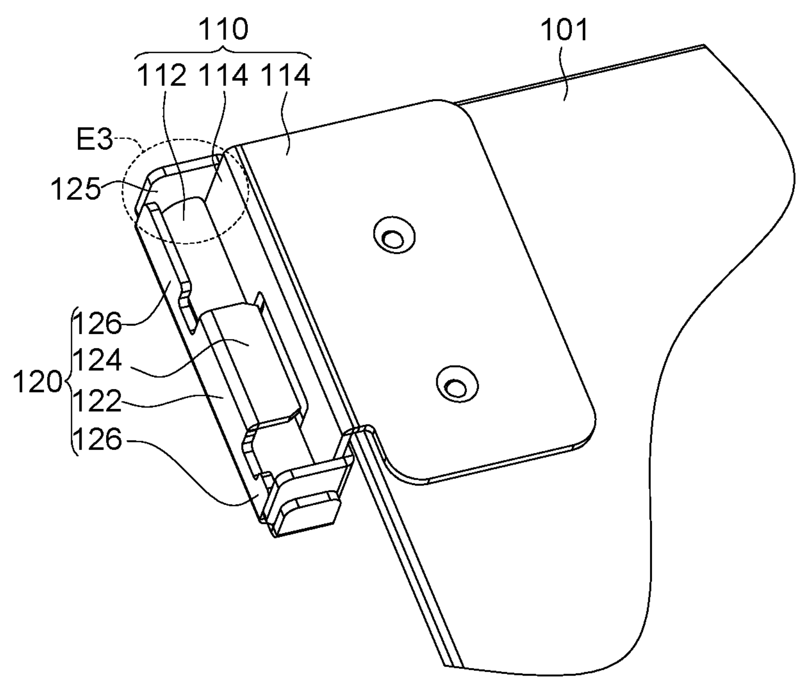
FIG. 2C is a schematic diagram of a hinge structure according to the invention another embodiment.
Figure 4:
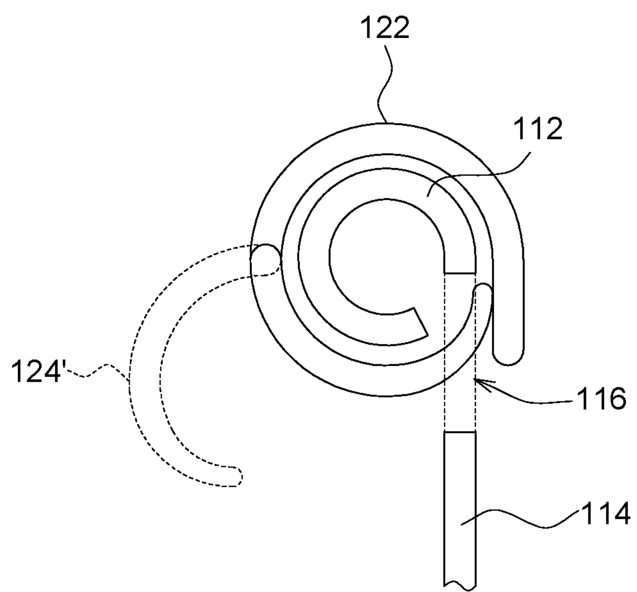
FIG. 4 is a schematic diagram of a limiting member disposed on the bushing being a movable tongue.

Moreover, the second component 120 can be another metal plate formed by a metal stamping step, a winding step, a cutting step and a forming step. The bushing 122 can be formed by a hollowed body. The bushing 122 has a close end E1 and an open end E2 disposed oppositely. The shaft 112 of the first component 110 can be received in the bushing 122 via the open end E2. The shaft 112 can lean on the close end E1. The close end E1 supports the first component 110 and the door panel 101. Meanwhile, the shaft 112 can move away from the bushing 122 via the open end E2, such that the first component 110 and the second component 120 are separated from each other. Refer to FIG. 2C. In an embodiment, the open end E2 can be covered by a metal plate 125 to form a close end E3, therefore the shaft 112 can only rotate in the bushing 122 and cannot generate an axial displacement in the bushing 122. The metal plate 125 can be an independent kit or can be integrally formed in one piece with the bushing 122. When the metal plate 125 and the bushing 122 are integrally formed in one piece, the shaft 112 of the first component 110 can be installed on the bushing 122 as the movable tongue 124' of FIG. 4 is opened.

Refer to FIGS. 2A and 2B. The limiting member 124 can be a tongue integrally formed on the bushing 122 in one piece. The tongue and the arced surface of the bushing 122 are interconnected. The tongue and the bushing 122 partially cover the surrounding of the shaft 112 (that is, a non-closed coverage). Thus, the bushing 122 of the present embodiment can be formed by a non-closed bushing 122, which reserves a radial opening 123 allowing the first component 110 and the second component 120 to be nested together, wherein the radial opening 123 is interconnected with the open end E2 and extends to the close end E1 from the open end E2 along the axial direction of the bushing 122. Therefore, when the shaft 112 of the first component 110 moves towards the bushing 122 via the open end E2, the first component 110 still can be nested with the second component 120 via the radial opening 123.

Figure 3A:
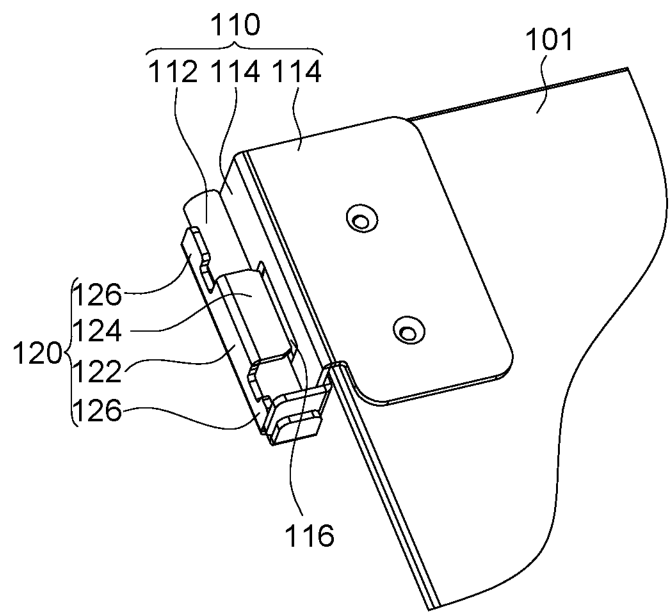
FIG. 3A is a schematic diagram of a hinge structure whose first component is at a first position.
Figure 3B:
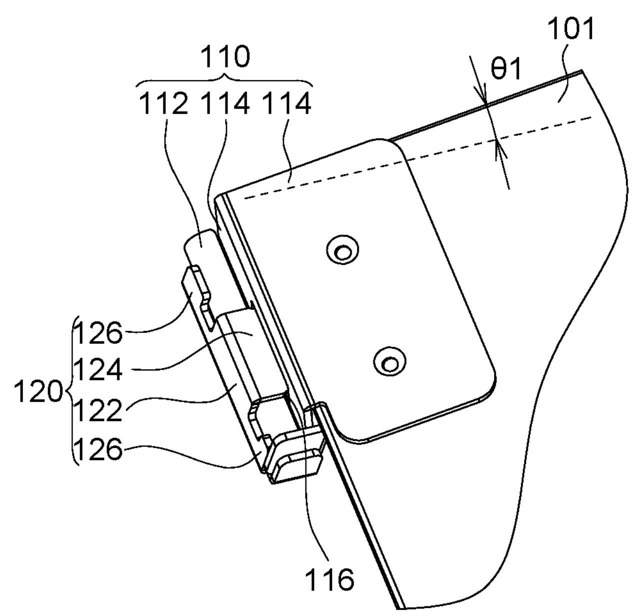
FIG. 3B is a schematic diagram of a hinge structure whose first component is at a second position.

Refer to FIGS. 3A and 3B. FIG. 3A is a schematic diagram of a hinge structure 102 whose first component 110 is at a first position. FIG. 3B is a schematic diagram of a hinge structure 102 whose first component 110 is at a second position. In the present embodiment, the connection member 114 includes a slot 116 opposite to the limiting member 124 of the second component 120. After the first component 110 and the second component 120 are nested together, the first component 110 can rotate with respect to the second component 120 and move to the second position from the first position (that is, rotate for the first angle θ1), and make the limiting member 124 and the slot 116 be coupled together.

The door panel 101 is not opened at the first position. Meanwhile, the rotation angle of the shaft 112 is 0°. When the first component 110 moves to the second position from the first position, the door panel 101 is opened, and the rotation angle of the shaft 112 (that is, the first angle θ1) is between 30°-45°, the limiting member 124 and the slot 116 approach towards each other and become coupled.

When the limiting member 124 and the slot 116 are coupled together, the limiting member 124 and the slot 116 interfere with each other on the axial direction of the shaft 112. Since the positions of the first component 110 and the second component 120 are limited, the shaft 112 can only rotate (has the rotational freedom only) and cannot make axial displacement.

Refer to FIG. 3A. The limiting member 124 and the slot 116 are separated from each other when the first component 110 is at a first position, such that the first component 110 and the second component 120 are at a detachable state. That is, the first component 110 and the second component 120 do not interfere with each other on the assembly direction (for example, the axial direction of the shaft 112). Refer to FIG. 3B. The limiting member 124 and the slot 116 are coupled when the first component 110 moves to a second position from the first position, such that the first component 110 and the second component 120 are in a non-detachable state. That is, the first component 110 and the second component 120 interfere with each other on the assembly direction (for example, the axial direction of the shaft 112). By changing the position (or the rotation angle) of the first component 110, the first component 110 can be installed in the hinge structure 102 of the present embodiment, such that the assembly process of the shaft 112 can be simplified and the installation of the shaft 112 can be made easier.

Figure 3C:
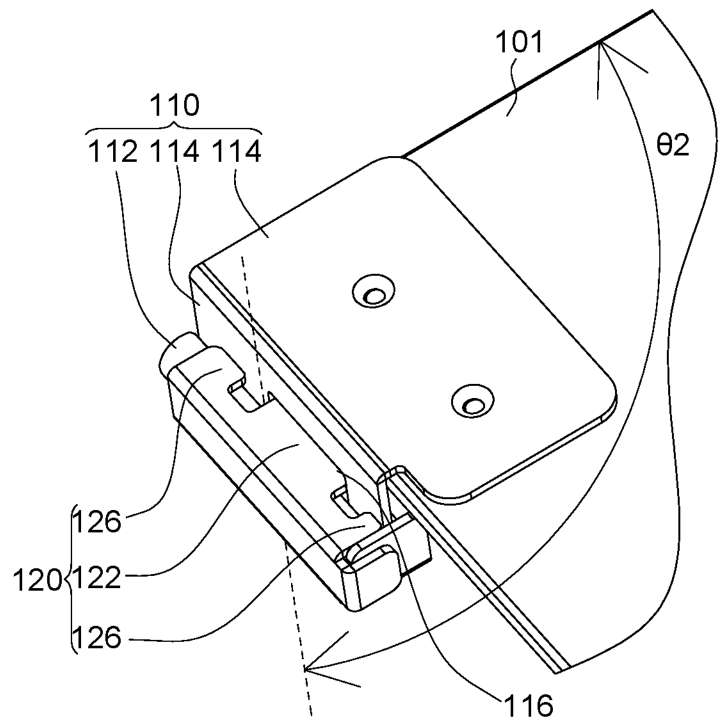
FIG. 3C is a schematic diagram of a hinge structure whose first component leans on a stopping member.

Referring to FIG. 3C, a schematic diagram of a hinge structure 102 whose first component 110 leans on a stopping member 126 is shown. In the present embodiment, the hinge structure 102 may further include at least one stopping member 126 disposed on two opposite sides of the limiting member 124. The distance between the stopping member 126 and the connection member 114 is relatively larger than that between the limiting member 124 and the connection member 114. When the limiting member 124 and the slot 116 of the connection member 114 are coupled together, a distance is formed between the stopping member 126 and the connection member 114, and the first component 110 will not stop rotating until the stopping member 126 and the connection member 114 lean on each other. Thus, the hinge structure 102 of the present embodiment can control the rotation angle of the shaft 112 through the stopping member 126 and can make the shaft 112 stop when rotating to a pre-determined angle (that is, the second angle θ2), such as an angle of 90° or above.

In other embodiments, the position of the stopping member 126 is adjustable, and the arrangement of the stopping member 126 is not limited to above exemplifications. For example, the stopping member 126 can also be disposed on the first component 110. When the shaft 112 rotates to a pre-determined angle, the stopping member 126 is stopped by the second component 120 and stops, such that the rotation angle of the shaft 112 can be controlled. Or, the stopping member 126 can be made by any independent element generating interference with the first component 110. When the shaft 112 rotates to a pre-determined angle, the first component 110 is limited by the stopping member 126 and stops, such that the rotation angle of the shaft 112 can be controlled.

In the above embodiments, it is exemplified that a tongue is integrally formed on the bushing 122 in one piece. In another embodiment, the limiting member disposed on the bushing 122 can also be made by a movable tongue 124'. Refer to FIG. 4. The movable tongue 124' can be slidably or rotatably disposed on the bushing 122, and the movable tongue 124' and the slot 116 are disposed oppositely.

The arrangement of the movable tongue 124' is similar to the arrangement of changing the position of the first component 110 as disclosed in above embodiment except for the matching element. The movable tongue 124' and the slot 116 can be separated from each other when the movable tongue 124' is at a first position (for example, rotates to open or slide off), such that the first component 110 and the second component 120 are at a detachable state. That is, the first component 110 and the second component 120 do not interfere with each on the assembly direction (for example, the axial direction of the shaft 112). Or, the movable tongue 124' and the slot 116 are coupled when the movable tongue 124' moves to a second position from the first position (for example, rotate to shut or slide in), such that the first component 110 and the second component 120 are in a non-detachable state. That is, the first component 110 and the second component 120 interfere with each other on the assembly direction (for example, the axial direction of the shaft 112). By changing the position of the movable tongue 124', the first component 110 can be installed in the hinge structure 102 of the present embodiment, such that the assembly process of the shaft 112 can be simplified and the installation of the shaft 112 can be made easier.

In an embodiment, the movable tongue 124' can be used in combination with an elastic element such as a spring, such that the movable tongue 124' normally remains at a shut state. That is, the movable tongue 124' and the slot 116 are normally coupled. When the shaft 112 needs to be installed or detached, the movable tongue 124' moves to an open state.

In an embodiment, when the movable tongue 124' is disposed on the bushing 122, the shaft 112 of the first component 110 can be received in the bushing 122 directly instead of passing through the open end E2. That is, the shaft 112 is received in the bushing 122 via the radial opening 123 formed by the opened movable tongue 124'. Since the bushing 122 can be the bushing with the two closed ends E1 and the hollowed shaft 112 can lean on the two close ends E1 of the bushing 122 and become limited, the hollowed shaft 112 can only rotate (only has the rotational freedom) and cannot make axial displacement.

The hinge structure disclosed in above embodiments of the invention can be installed on a door panel to provide an open/shut function to the door panel. Since the hinge structure is formed of two components and the shaft can be integrally formed in one piece with one of the two components, the element quantity of the hinge structure can be reduced and the manufacturing cost can be lowered. Besides, since the open end of the shaft of the hinge structure disclosed in above embodiments of the invention can be received in the bushing via the open end or the radial opening of the bushing, the installation process of the shaft can be simplified and the installation of the shaft can be made easier.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge structure, comprising:

a first component, comprising a shaft and a connection member, wherein the shaft is fixed on the connection member, and the shaft is a hollowed body; and a second component, comprising a bushing and a limiting member, wherein the shaft is received in the bushing, the limiting member is disposed on the bushing, and the first component is detachably installed on the second component through the limiting member.

2. The hinge structure according to claim 1, wherein the shaft and the connection member are winded up together.

3. The hinge structure according to claim 1, wherein the limiting member and the bushing are integrally formed in one piece, and the limiting member and the bushing partially cover and surround the shaft.

4. The hinge structure according to claim 1, wherein the connection member comprises a slot opposite to the limiting member, the limiting member and the slot are separated from each other when the first component is at a first position, such that the first component and the second component are at a detachable state; the limiting member and the slot are coupled to each other when the first component moves to a second position from the first position, such that the first component and the second component are in a non-detachable state.

5. The hinge structure according to claim 1, wherein the limiting member is a movable tongue disposed on the bushing, the connection member comprises a slot opposite to the movable tongue, the movable tongue and the slot are separated from each other when the movable tongue is at a first position, such that the first component and the second component are at a detachable state; the movable tongue and the slot are coupled to each other when the movable tongue moves to a second position from the first position, such that the first component and the second component are in a non-detachable state.

6. The hinge structure according to claim 1, further comprising at least one stopping member, wherein the stopping member and the first component interfere with each other when the shaft rotates to a pre-determined angle.

7. A hinge structure, comprising:

a first component, comprising a shaft and a connection member, wherein the shaft is fixed on the connection member; and a second component, comprising a bushing and a limiting member, wherein the bushing has a closed end and an open end opposite to the closed end, the shaft is received in the bushing, the limiting member is disposed on the bushing, and the first component is detachably installed on the second component through the limiting member.

8. A hinge structure, comprising:

a first component, comprising a shaft and a connection member, wherein the shaft is fixed on the connection member; and a second component, comprising a bushing and a limiting member, wherein the bushing has two closed ends and a radial opening disposed between the two closed end, and the shaft is received in the bushing via the radial opening, the limiting member is disposed on the bushing, and the first component is detachably installed on the second component through the limiting member.

* * * * *